United States Patent
Harris et al.

(10) Patent No.: US 7,867,588 B2
(45) Date of Patent: Jan. 11, 2011

(54) POLYETHYLENE MELT BLENDS FOR HIGH DENSITY POLYETHYLENE APPLICATIONS

(75) Inventors: Michael G. Harris, Findlay, OH (US); Joseph M. Starita, Marysville, OH (US)

(73) Assignee: Media Plus, Inc., Findlay, OH (US)

(*) Notice: Subject to any disclaimer, the term of this patent is extended or adjusted under 35 U.S.C. 154(b) by 734 days.

(21) Appl. No.: 11/802,426

(22) Filed: May 22, 2007

(65) Prior Publication Data
US 2008/0114131 A1    May 15, 2008

Related U.S. Application Data

(63) Continuation of application No. 10/022,706, filed on Dec. 17, 2001, now abandoned.

(51) Int. Cl.
B29D 22/00 (2006.01)
B29D 23/00 (2006.01)
B32B 1/08 (2006.01)

(52) U.S. Cl. ............... 428/35.7; 428/500; 428/523; 525/55; 525/240; 524/197; 524/581; 522/161

(58) Field of Classification Search ......... 428/35.7, 428/523, 500; 525/55, 240; 524/197, 581; 522/161
See application file for complete search history.

(56) References Cited

U.S. PATENT DOCUMENTS

| | | | |
|---|---|---|---|
| 3,176,052 A | 3/1965 | Peticolas | |
| 3,231,636 A | 1/1966 | Snyder et al. | |
| 3,261,889 A | 7/1966 | van't Wout | |
| 3,280,220 A | 10/1966 | Nelson | |
| 3,795,633 A | 3/1974 | Golovoy et al. | |
| 3,884,855 A | 5/1975 | Baumann et al. | |
| 3,976,612 A | 8/1976 | Kaji et al. | |
| 3,998,914 A | 12/1976 | Lillis et al. | |
| 4,076,698 A | 2/1978 | Anderson et al. | |

(Continued)

FOREIGN PATENT DOCUMENTS

CA    1106099    7/1981

(Continued)

OTHER PUBLICATIONS

Equistar Chemicals, "The Chemistry of Polyethylene Insulation," Sep. 2002, available at http://www.equistarchem.com/TechLit/tech%20Topics/Equistar%20Industry%20Papers/Chemistry%20of%20%PE%20Insulation.pdf.

(Continued)

*Primary Examiner*—Michael C Miggins
(74) *Attorney, Agent, or Firm*—Finnegan, Henderson, Farabow, Garrett & Dunner, LLP

(57) ABSTRACT

A polyethylene composition is provided that has a density of about 0.945 to about 0.960 g/cm$^3$ and a melt flow index of about 0.1 to about 0.4. The composition is a melt blend of a linear low density polyethylene resin and/or a linear medium low density polyethylene resin, and a high density polyethylene resin. A feature of the composition is that the resins can independently be virgin, recycled, scrap and/or wide specification resins, and mixtures of these. Methods of producing the compositions and extruded, molded and formed plastic articles manufactured from the compositions are presented.

31 Claims, 4 Drawing Sheets

U.S. PATENT DOCUMENTS

| | | | |
|---|---|---|---|
| 4,115,499 A | 9/1978 | Salyer et al. |
| 4,303,710 A | 12/1981 | Bullard et al. |
| 4,330,639 A | 5/1982 | Matsuura et al. |
| 4,332,748 A | 6/1982 | Fremont |
| 4,346,834 A | 8/1982 | Mazumdar |
| 4,374,227 A | 2/1983 | Michie, Jr. |
| 4,390,666 A | 6/1983 | Moriguchi et al. |
| 4,461,873 A | 7/1984 | Bailey et al. |
| 4,495,334 A | 1/1985 | Matsuura et al. |
| 4,536,550 A | 8/1985 | Moriguchi et al. |
| 4,547,551 A | 10/1985 | Bailey et al. |
| 4,550,143 A | 10/1985 | Tanaka et al. |
| 4,556,768 A | 12/1985 | Atsumi et al. |
| 4,567,069 A | 1/1986 | Jabarin |
| 4,577,768 A | 3/1986 | Go et al. |
| 4,737,547 A | 4/1988 | White |
| 4,786,688 A | 11/1988 | Thiersault et al. |
| 4,812,504 A | 3/1989 | Su |
| 4,824,912 A | 4/1989 | Su |
| 4,835,219 A | 5/1989 | Tajima et al. |
| 4,911,985 A | 3/1990 | Jenkins et al. |
| 4,962,148 A | 10/1990 | Orikasa et al. |
| 5,028,663 A | 7/1991 | Chung |
| 5,030,662 A | 7/1991 | Banerjie |
| 5,066,542 A | 11/1991 | Tabor et al. |
| 5,071,686 A | 12/1991 | Genske et al. |
| 5,073,416 A | 12/1991 | Avakian et al. |
| 5,073,598 A | 12/1991 | Anzini |
| 5,102,955 A | 4/1992 | Calabro et al. |
| 5,153,039 A | 10/1992 | Porter et al. |
| 5,155,151 A | 10/1992 | Hashimoto et al. |
| 5,185,199 A | 2/1993 | Sawyer et al. |
| 5,189,106 A | 2/1993 | Morimoto et al. |
| 5,210,142 A | 5/1993 | Kale et al. |
| 5,254,617 A | 10/1993 | Inoue et al. |
| 5,278,232 A | 1/1994 | Seelert et al. |
| 5,338,589 A | 8/1994 | Böhm et al. |
| 5,382,630 A | 1/1995 | Stehling et al. |
| 5,418,272 A | 5/1995 | Kawabata et al. |
| 5,468,809 A | 11/1995 | Ghisellini et al. |
| 5,494,965 A | 2/1996 | Harlin et al. |
| 5,534,317 A | 7/1996 | Herman et al. |
| 5,534,572 A | 7/1996 | Taylor et al. |
| 5,552,198 A | 9/1996 | Hiltner et al. |
| 5,594,071 A | 1/1997 | Takahashi et al. |
| 5,601,891 A | 2/1997 | Herman et al. |
| 5,631,069 A | 5/1997 | Wooster et al. |
| 5,635,262 A | 6/1997 | Best et al. |
| 5,663,236 A | 9/1997 | Takahashi et al. |
| 5,693,391 A | 12/1997 | Herman et al. |
| 5,736,237 A | 4/1998 | Rhee et al. |
| 5,766,712 A | 6/1998 | Darr et al. |
| 5,783,637 A | 7/1998 | Herman et al. |
| 5,858,491 A | 1/1999 | Geussens et al. |
| 5,908,677 A | 6/1999 | Hiltner et al. |
| 5,908,679 A | 6/1999 | Berthold et al. |
| 5,959,006 A | 9/1999 | Pungtrakul |
| 5,981,664 A | 11/1999 | Neumann et al. |
| 6,063,871 A | 5/2000 | Kishne et al. |
| 6,090,893 A | 7/2000 | Harlin et al. |
| 6,156,845 A | 12/2000 | Saito et al. |
| 6,191,227 B1 | 2/2001 | Matsuoka et al. |
| 6,194,520 B1 | 2/2001 | Cheruvu et al. |
| 6,204,349 B1 | 3/2001 | Shinohara et al. |
| 6,218,472 B1 | 4/2001 | Debras et al. |
| 6,265,055 B1 | 7/2001 | Simpson et al. |
| 6,649,698 B1 | 11/2003 | Mehta |
| 6,749,914 B2 | 6/2004 | Starita |
| 2003/0171492 A1 | 9/2003 | Starita |
| 2005/0004316 A1 | 1/2005 | Starita |

FOREIGN PATENT DOCUMENTS

| | | |
|---|---|---|
| CA | 1106521 | 8/1981 |
| CA | 1124948 | 6/1982 |
| CA | 2070470 | 12/1992 |
| DE | 0126977 | 8/1977 |
| DE | 2943380 | 5/1980 |
| DE | 0268963 | 6/1989 |
| DE | 19945980 | 3/2001 |
| EP | 0129312 | 12/1984 |
| EP | 0134427 | 3/1985 |
| EP | 0273284 | 7/1988 |
| EP | 0310051 | 4/1989 |
| EP | 0339990 | 11/1989 |
| EP | 0707040 | 4/1991 |
| EP | 0517222 | 12/1992 |
| EP | 0533154 | 3/1993 |
| EP | 0545181 | 6/1993 |
| EP | 1146070 | 10/2001 |
| FR | 2405961 | 5/1979 |
| GB | 0815805 | 7/1956 |
| GB | 0829148 | 6/1957 |
| GB | 0843697 | 8/1960 |
| GB | 0860329 | 2/1961 |
| GB | 0944208 | 12/1963 |
| GB | 2007685 | 5/1979 |
| GB | 2028716 | 3/1980 |
| JP | 53125452 | 11/1978 |
| JP | S54-100444 | 8/1979 |
| JP | 5582140 | 6/1980 |
| JP | 60031938 A | 2/1985 |
| JP | 61043639 | 3/1986 |
| JP | 09241437 | 9/1997 |
| WO | 9117900 | 11/1991 |
| WO | 9119763 | 12/1991 |
| WO | 9313141 | 7/1993 |
| WO | 9315887 | 8/1993 |
| WO | 9422948 | 10/1994 |
| WO | PCT/US03/00816 | 3/2003 |

OTHER PUBLICATIONS

Gibbs, M.L., "Evaluations of Post-Consumer Recycled High Density Polyethylene," Quantum Chemical Corporation (13 pgs.) [pre Feb. 1997].
Gibbs, M.L., "Post-Consumer Recycled HDPE evaluated" (2 pgs.) [pre Feb. 1997].
Gibbs, M.L., "Recycling-Post-Consumer Recycled HDPE: Suitable for Blowmolding?", Plastics Engineering, pp. 57-59 (Jul. 1990).
Harris, Michael G., U.S. Appl. No. 10/112,200, filed Mar. 29, 2002.
Package Manufacturing, "Resin contamination limits HDPE reuse," Packaging Digest, pp. 78, 81-82 (Jul. 1990).
Starita, Joseph M., U.S. Appl. No. 10/017,314, filed Dec. 14, 2001.
Starita, Joseph M., U.S. Appl. No. 10/194,136, filed Jul. 12, 2002.
Starita, Joseph M., U.S. Appl. No. 10/337,084, filed Jan. 6, 2003.
Speed, C.S. et al., "Structure/Property Relationships in Exxpol™ Polymers," Society of Plastics Engineers Polyolefins VII International Conference, Houston, TX, Feb. 24-27, 1991.
Williams, T. et al., Polymer Letters, vol. 6, pp. 621-624 (1968).
"We're looking at flexible barrier Packaging in a whole new light," Curwood Advertisement, (2 pgs.) [pre Feb. 1997].

POLYETHYLENE MELT BLENDS FOR HIGH DENSITY POLYETHYLENE APPLICATIONS

This is a continuation of application Ser. No. 10/022,706, filed on Dec. 17, 2001 now abandoned, which is incorporated herein by reference.

BACKGROUND OF THE INVENTION

Plastic pipe, especially for use in drainage, irrigation, storm sewer and sanitary sewer applications, is produced from high density polyethylene (HDPE). A typical pipe composition contains a high density polyethylene copolymer having a melt flow rate of approximately 0.15 to 0.4 grams per 10 minutes that is blended with carbon black to minimize the effect of ultraviolet light. The Departments of Transportation (DOT) of many states of the United States require plastic pipe used for DOT projects to meet American Association of State Highway Transportation Officials (AASHTO) standards, that include American Society of Testing Materials (ASTM) standards. Current AASHTO standards for corrugated and profile HDPE pipe require the composition of the pipe to have the following properties: a minimum carbon black content of 2 percent by weight; a density of 0.945 to 0.955 grams per cubic centimeter ($g/cm^3$); a melt flow index (MFI) maximum of 0.4; a minimum flexural modulus of 110,000 pounds per square inch (psi); a minimum tensile strength of 3,000 psi; and a minimum stress crack resistance of 24 hours determined by a notched constant tensile load test (NCTL) performed according to ASTM D5397. As used herein, the melt flow index is intended as an equivalent expression to the melt flow rate expressed as grams per 10 minutes at 190° C.

Many commercially available HDPE resins meeting the standards for density, MFI, flexural modulus and tensile strength, fail the NCTL test due to their characteristic broad molecular weight distribution (MWD) that includes the presence of a low molecular weight fraction that contributes to failure of the NCTL test.

To address this problem, specialized narrow MWD, stress crack resistant grades of HDPE have been produced by multistage polymerization to produce a bimodal or multimodal HDPE that when mixed with, for example, about 2 to about 6 percent by weight of carbon black, satisfies AASHTO requirements for corrugated and profile pipe. However, the reactor yield of the specialized HDPE during polymerization typically varies directly with the breadth of the molecular weight distribution. As a result, HDPE resins with narrow MWD are usually sold at a premium.

In another approach, blending of polyethylene resins has been used to address the problem of stress crack resistance. For example, medium density polyethylene pipe blends with improved low temperature brittleness properties and gloss have been obtained, that are composed of HDPE and a concentrate mixture of linear low density polyethylene (LLDPE) and a carbon black, where the LLDPE is a carrier for the carbon black. This approach has the disadvantage that the resulting medium density polyethylene pipe blends have densities (e.g., 0.926 to 0.940 $g/cm^3$) that are too low to meet the AASHTO requirements for corrugated and profile HDPE pipe. Other approaches employ two-stage HDPE polymerization processes to produce bimodal HDPE that is used as a blending component for a resulting medium density polyethylene having a density of 0.930 to 0.940 $g/cm^3$. Similarly, triblends containing a major portion of LLDPE and minor amounts of HDPEs of low molecular weight or high molecular weight have also been reported. However, none of the above methods results in an HDPE having a density of 0.945 to 0.955 $g/cm^3$ and a MFI maximum of 0.4, required by AASHTO for corrugated and profile pipe.

SUMMARY OF THE INVENTION

The invention provides a melt-blended polyethylene composition that, when used in the manufacture of profile and corrugated pipe, pipe fittings, and the like, results in products that meet or exceed AASHTO standards for density, MFI, flexural modulus, tensile strength and stress crack resistance. An advantage of using a melt blended polyethylene composition in accordance with the invention is that, instead of the need for specially polymerized, premium cost HDPE for pipe, commodity grade resins, including virgin, recycled, scrap and wide specification resins, and the like, can be employed, resulting in significant cost savings. Moreover, by taking advantage of the properties of polyethylenes, especially density and melt flow index, molecular weight distribution, modality (i.e., unimodal, bimodal, or multimodal), and the like, HDPE can be selectively combined with LLDPE and/or linear medium density polyethylene (LMDPE) in a melt blend to result in compositions having the desired properties.

Thus, regardless of the combination of resins employed, the resulting melt blended polyethylene composition has a density of about 0.945 to about 0.960 $g/cm^3$, preferably about 0.945 to about 0.955 $g/cm^3$ and, especially, 0.945 to 0.955 $g/cm^3$, a melt flow index of about 0.1 to about 0.4, preferably about 0.1 to 0.4, and a stress crack resistance of at least 24 hours. As used herein, (i) the density of the composition refers to the density prior to compounding of the composition with other materials, such as carbon black, and the like, and (ii) the term "polyethylene" shall admit of (though not require) the presence of small amounts of propylene, butene, hexene, octene and/or metallacene, and the like, as is known to those skilled in the art.

In one embodiment of the invention, the polyethylene composition comprises a melt blend of HDPE and at least one resin selected from the group consisting of LLDPE, LMDPE, and mixtures of these, the resins being present in the melt-blended polyethylene composition in amounts relative to one another such that the composition has a density of about 0.945 to about 0.960 $g/cm^3$, a melt flow index of about 0.1 to about 0.4, and a stress crack resistance of at least 24 hours. In a preferred embodiment, the HDPE can be present in an amount of about 50 to about 95 percent by weight. Correspondingly, the LLDPE and/or LMDPE can be present in an amount of about 5 to about 50 percent by weight. The LLDPE and/or LMDPE preferably have a melt flow index of about 0.1 to about 1.5 and a density of about 0.920 to about 0.940 $g/cm^3$. The HDPE preferably has a melt flow index of about 0.01 to about 1.5 and a density of about 0.941 to about 0.970 $g/cm^3$.

In an embodiment of the invention, the HDPE can be selected from the group consisting of a high molecular weight high density polyethylene resin (HMW-HDPE) having a melt flow index of about 0.01 to about 0.2, a homopolymer high density polyethylene resin (H-HDPE) having a melt flow index of about 0.1 to about 1.5, and mixtures of these. The HMW-HDPE can have a density of about 0.941 to about 0.958 $g/cm^3$, preferably about 0.945 to about 0.955 $g/cm^3$. The H-HDPE can have a density of about 0.957 to about 0.970 $g/cm^3$, preferably about 0.959 to about 0.965 $g/cm^3$.

In the foregoing embodiments, the resins can be independently selected from the group consisting of virgin, recycled, scrap and wide specification resins, and mixtures thereof.

The invention also provides methods for producing the melt blended polyethylene compositions according to embodiments of the invention, and extruded, molded or formed products, especially pipes and/or pipe fittings, comprising the composition.

DETAILED DESCRIPTION OF THE INVENTION

Figure 1:
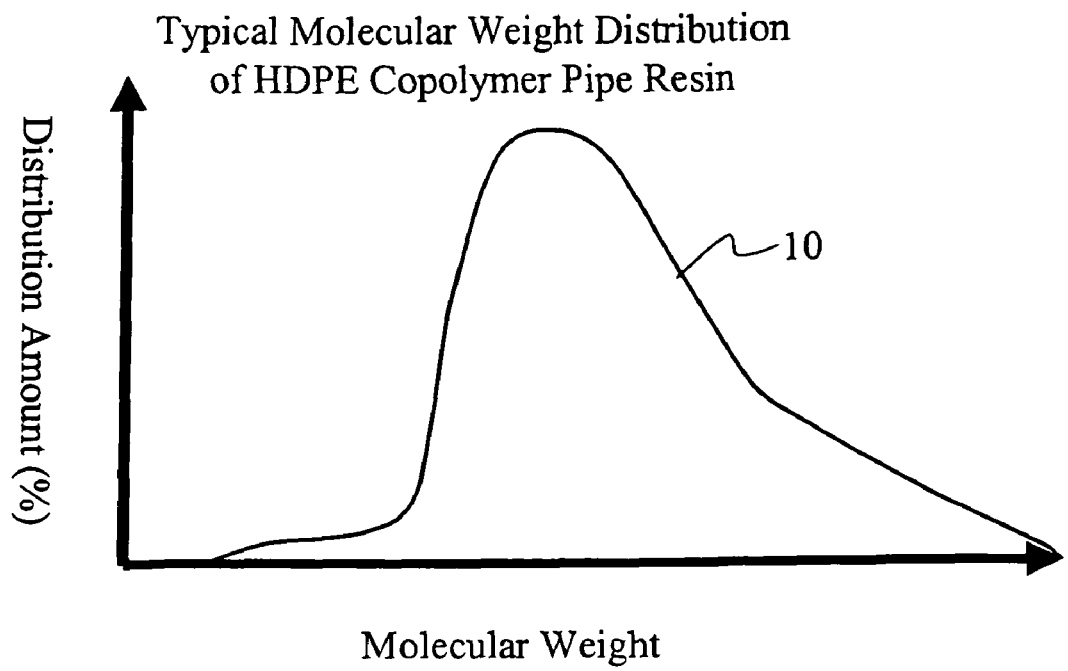
FIG. 1 illustrates a molecular weight distribution (MWD) curve for a typical prior art HDPE copolymer pipe resin having a low molecular weight tail.

A polyethylene composition in accordance with the invention is a melt blend of high density polyethylene resins especially for use in the manufacture of pipe and pipe fittings, such as, but not limited to, those used for drainage, irrigation, storm sewer and sanitary sewer applications. The composition is particularly useful for extruded, injection molded and blow molded profile and corrugated pipe and pipe fittings. The composition is also useful in the manufacture of other extruded, molded or formed plastic articles such as, but not limited to, smooth or corrugated conduit pipe for electrical, fiber-optic and telecommunication applications, wire and cable insulation materials, injection molded parts, extruded films and sheets (e.g., geomembranes and environmental films, such as those used for pond liners, landfill liners, and the like), environmental chambers, and the like, especially for applications in which good stress crack resistance is desired.

As referred to herein, density, MFI and stress crack resistance measurements are obtained according to ASTM D1505, ASTM D1238, and ASTM D5397, respectively. Flexural modulus and tensile strength are measured according to ASTM D790 and ASTM D638, respectively. Other tests that may be conducted for stress crack resistance include, but are not limited to, the standard bent strip Environmental Stress Crack Resistance test (ESCR), according to ASTM D1693, the Notched Constant Ligament Stress Test (ASTM D5397), and the Bottle ESCR test (ASTM D2561).

Enhancement of the environmental and long term stress crack resistance of polyethylene molded articles is dependent on increasing the number of tie molecules connecting the crystalline lamellae of the semicrystalline high density polyethylene material. The number of tie molecules is inversely related to the low molecular weight faction of the polyethylene that forms the molded article. In other words, the low molecular weight polyethylene molecules associated with broad molecular weight distribution HDPE diminish the number of tie molecules between lamellae, with the effect of decreasing the stress crack resistance. Until the present invention, pipe manufacturers have had to rely on specially polymerized and expensive HDPE to satisfy standards for the physical properties of pipe. Conventional commodity HDPE has been unsatisfactory for use because of its broad molecular weight distribution, which includes a low molecular weight tail that contributes to failure of the NCTL test for stress crack resistance over a 24 hour period.

To address this problem, one embodiment of the invention provides a polyethylene composition in which LLDPE and/or LMDPE, and HDPE are melt blended together, for example in an extruder or other mixer (e.g., Banbury, Henschel, and the like), in amounts relative to one another such that the resulting melt-blended, moldable or otherwise formable polyethylene composition has a density of about 0.945 to about 0.960 g/cm$^3$, preferably about 0.945 to about 0.955 g/cm$^3$, a MFI of about 0.1 to about 0.4, preferably about 0.1 to 0.4, and a stress crack resistance of at least 24 hours. Preferably, the HDPE resin is present in the composition in an amount of about 50 to about 95 percent by weight and, correspondingly, the LLDPE and/or the LMDPE is present in an amount of about 5 to about 50 percent by weight.

Figure 2:
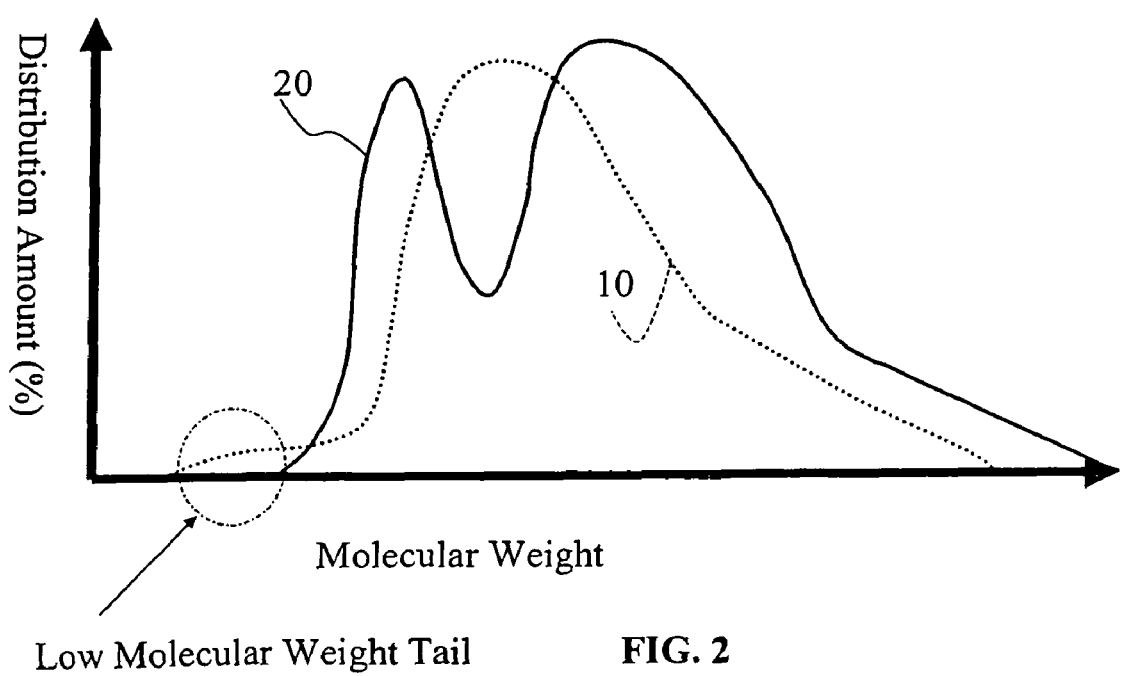
FIG. 2 illustrates a MWD curve for a prior art polymerized bimodal narrow molecular weight distribution HDPE copolymer overlaid with the curve of FIG. 1.

FIG. 1 illustrates the broad shape of the MWD of a conventional HDPE copolymer pipe resin (10) including the low molecular weight tail. A MWD curve for a specially polymerized bimodal narrow MWD HDPE copolymer (20) having a MFI in the same range as that of HDPE (10) is illustrated in FIG. 2, with the curve of FIG. 1 (dotted line) superimposed for comparison. The specialty HDPE (20) has superior stress crack resistance because it does not contain the low molecular weight tail present in conventional HDPE (10). The specialty HDPE (20) also has good processing characteristics based on its bimodal MWD.

Figure 3:
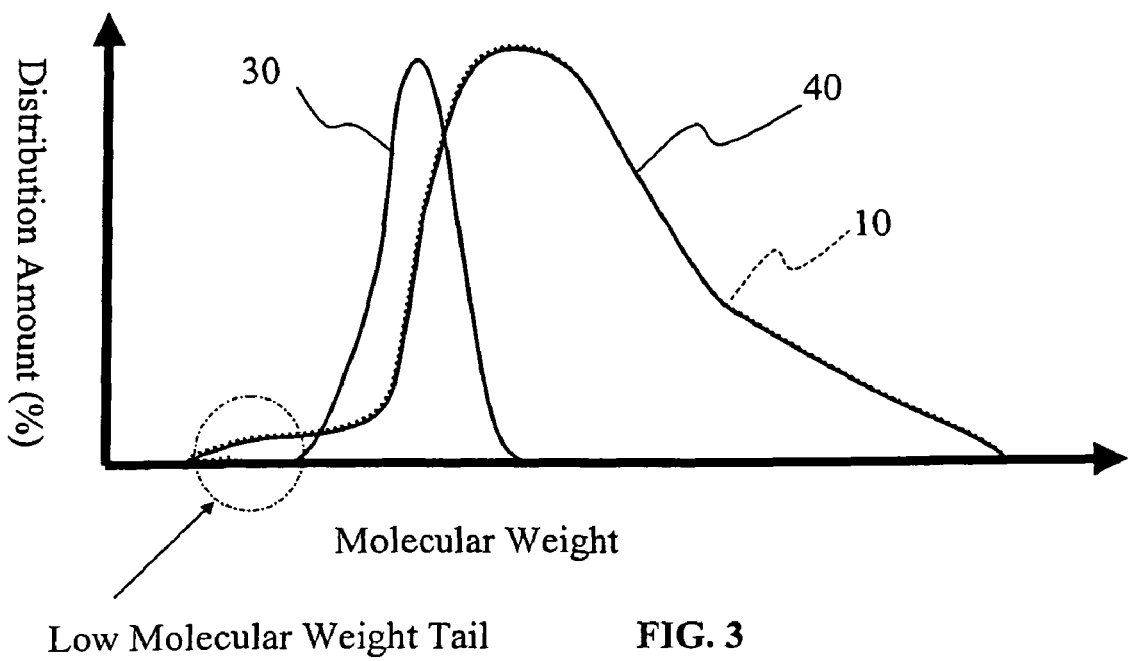
FIG. 3 illustrates component MWD curves for a blend of linear low density polyethylene (LLDPE) and a homopolymer high density polyethylene (H-HDPE), according to an embodiment of the invention, overlaid with the curve of FIG. 1.
Figure 4:
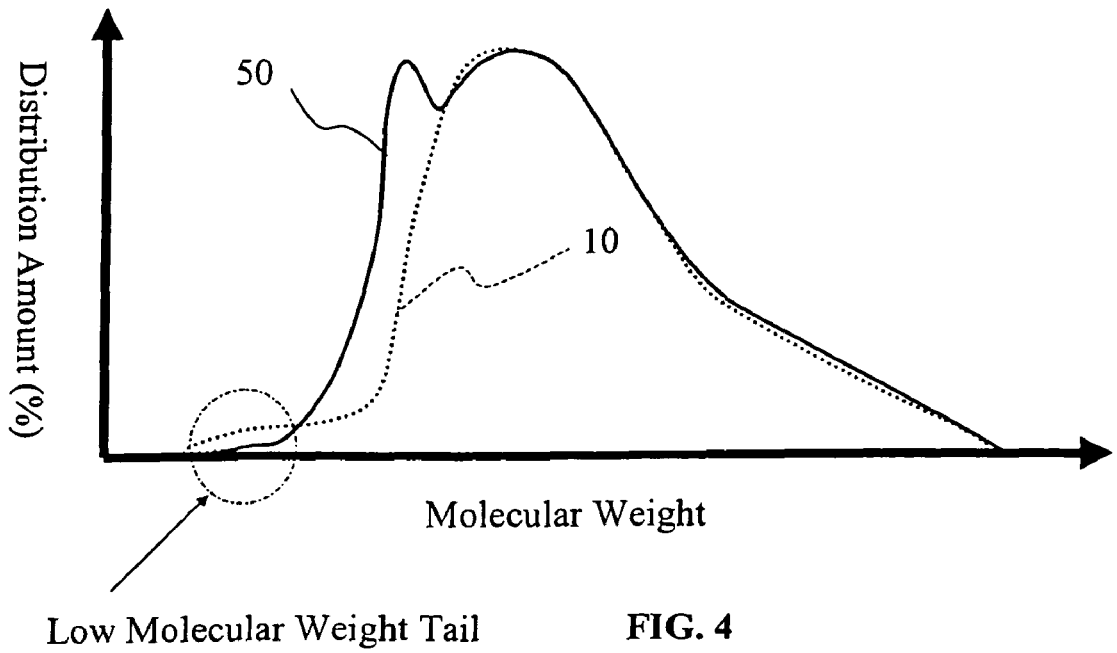
FIG. 4 illustrates the resulting MWD curve for the melt blend of LLDPE and H-HDPE illustrated in FIG. 3, overlaid with the curve of FIG. 1.

A narrow MWD (i.e., the absence of a low molecular weight tail) is also characteristic of polymerized LLDPE and LMDPE resins. Because of this narrow MWD, LLDPE and LMDPE have a high stress crack resistance. However LLDPE and LMDPE have a high melt flow rate (MFI), which can make processing difficult during extrusion and molding applications. The invention takes advantage of the high stress crack resistance characteristic of LLDPE and/or LMDPE, by melt blending LLDPE and/or LMDPE having a density of about 0.920 to about 0.940 g/cm$^3$ with a higher density conventional homopolymer HDPE (H-HDPE) or high molecular weight HDPE (HMW-HDPE) to increase processability. As the average molecular weight of the HDPE employed in the composition is increased, the more the MWD of the composition shifts to higher molecular weight. For example, an LLDPE and/or LMDPE having a density of about 0.920 to about 0.940 g/cm$^3$ can be melt blended with a H-HDPE having a density greater than 0.959 g/cm$^3$, to lift the blended density into the preferred density range of about 0.945 to about 0.960 g/cm$^3$. The MWD curves of the individual blend components of LLDPE (30) and a unimodal H-HDPE (40), of a composition according to the invention are illustrated in FIG. 3. The resulting bimodal MWD curve (50) of the melt blend containing these components is illustrated in FIG. 4. The curve of the conventional HDPE resin (10) (dotted line) from FIG. 1 is superimposed on each of the curves, for comparison. As illustrated in FIG. 4, the low molecular weight tail of the resulting melt blend compositions is greatly reduced compared to the low molecular weight tail of the conventional HDPE resin.

Figure 5:
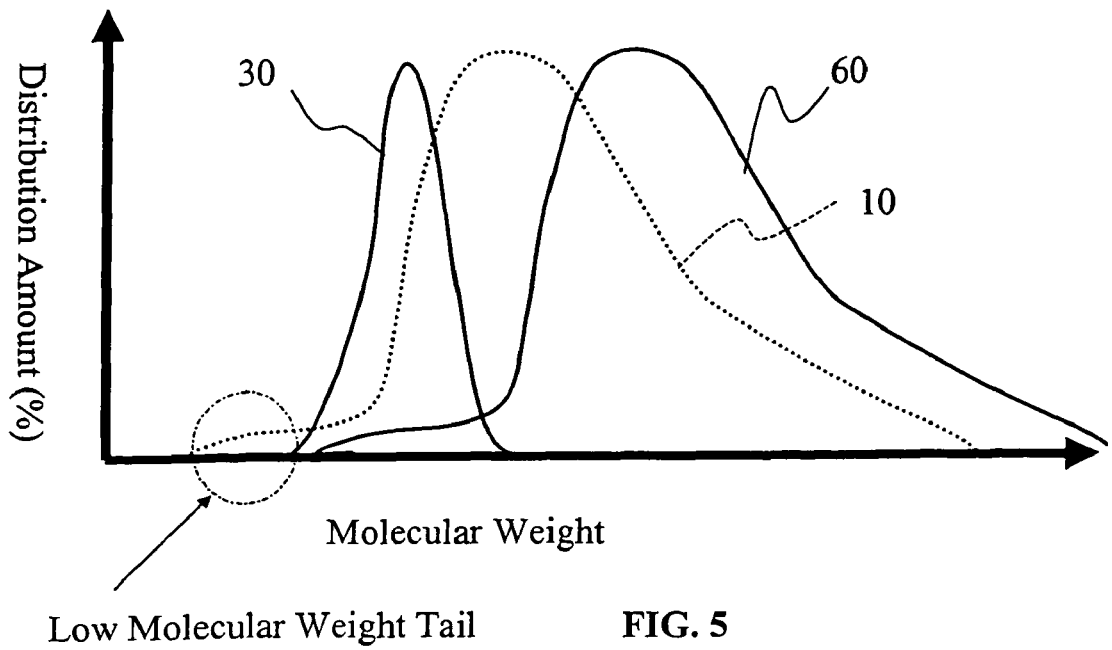
FIG. 5 illustrates component MWD curves for a blend of LLDPE and a HMW-HDPE, according to an embodiment of the invention, overlaid with the curve of FIG. 1.
Figure 6:
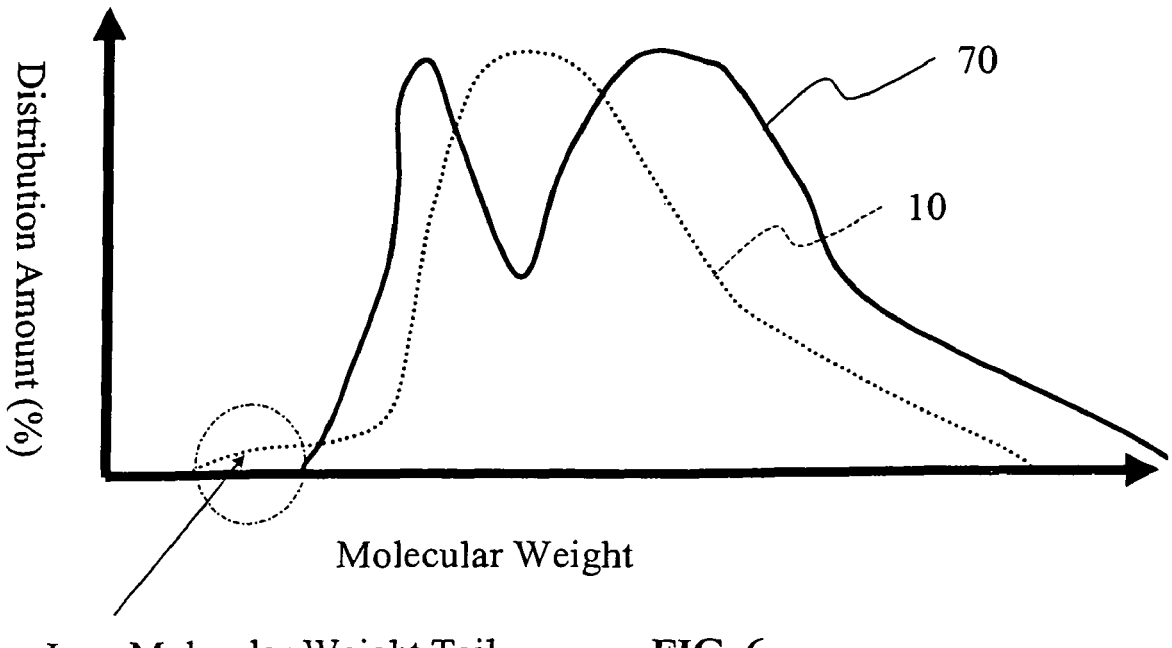
FIG. 6 illustrates the resulting MWD curve for the melt blend of LLDPE and HMW-HDPE illustrated in FIG. 5, overlaid with the curve of FIG. 1.

FIG. 5 illustrates the individual MWD curves of a melt blend composition according to the invention containing LLDPE (30) and a unimodal HMW-HDPE (60). As used in the context of the melt blended polyethylene compositions according to the invention, a HMW-HDPE is one that has a sufficiently high molecular weight that it, by itself, has a NCTL stress crack resistance that exceeds 24 hours. The HMW-HDPE (60) employed in the compositions also has a molecular weight that is sufficiently high that it does not contribute molecules of lower molecular weight than those of the LLDPE (30). FIG. 6 illustrates the bimodal MWD curve (70) of the resulting polyethylene melt blend, with the curve of the conventional HDPE resin (10) (dotted line) from FIG. 1 superimposed for comparison. In comparison with the conventional HDPE resin, the low molecular weight tail in this embodiment of the invention melt blend has disappeared.

Figure 7:
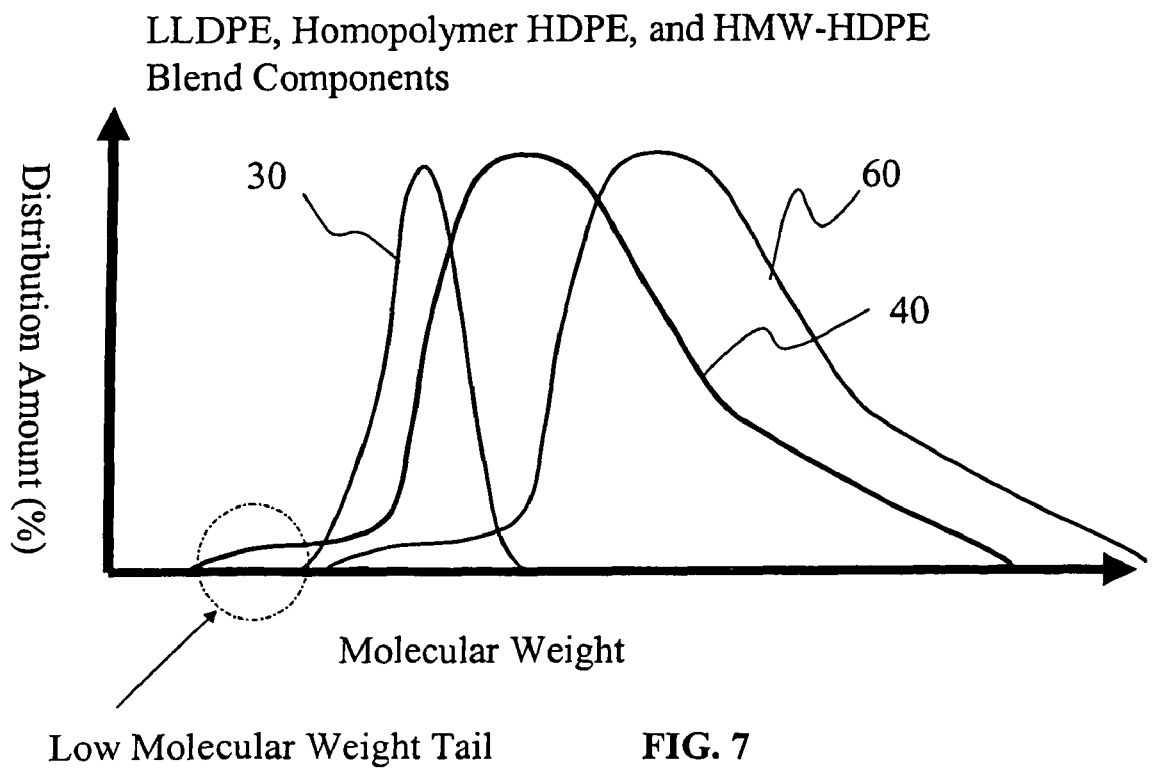
FIG. 7 illustrates component MWD curves for a terblend of LLDPE, H-HDPE and HMW-HDPE, according to an embodiment of the invention.
Figure 8:
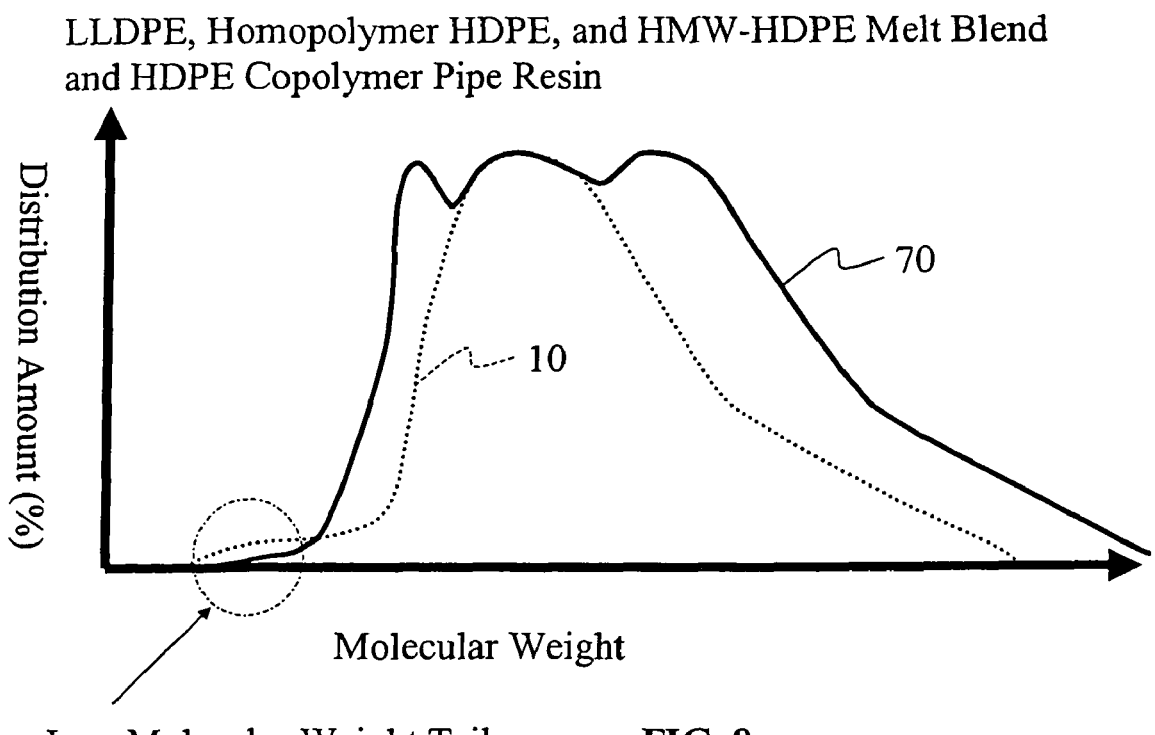
FIG. 8 illustrates the resulting MWD curve for the melt blend of LLDPE, H-HDPE and HMW-HDPE illustrated in FIG. 7, overlaid with the curve of FIG. 1.

In a preferred embodiment of the invention illustrated in FIG. 7, the LLDPE (30) is melt blended with both a unimodal H-HDPE (40) and a HMW-HDPE (60) to produce the trimodal MWD curve illustrated in FIG. 8. In comparison with the conventional HDPE resin, the low molecular weight tail in this embodiment of the melt blend is greatly reduced.

Another property that contributes to the selection of resins for the melt blend compositions according to the invention is the melt flow index, which is a measure of the viscosity of the component and affects the processability of the melt blend. For example, LLDPE having a high MFI can be melt blended with a HDPE having a lower MFI to achieve the desired stiffness and, therefore, the desired processability. The melt flow index is a general indicator of the weight average molecular weight of the resins.

Yet another property that contributes to the selection of resins for the melt blend compositions of the invention is the Flow Rate Ratio (FRR), such as that defined in ASTM D1238, which is a good indicator of the weight average molecular weight and a generally accepted test method for the polydispersity of polyethylene resin grades. Polydispersity is the ratio of the weight average molecular weight to the number average molecular weight, and the lower the polydispersity (and the FRR), the narrower is the MWD. Polydispersity can be measured by gel permeation chromatography (GPC), although this is not generally recommended for polyethylene resins, which have poor solubility unless special solvents are employed. GPC is also difficult to conduct as a quality control test on, for example, recycled and/or scrap resin products for use in the invention compositions. For example, such recycled or scrap products may include, but are not limited to, such usuable resins obtained as "milk jugs" produced from H-HDPE, "T-shirt bags" constructed from bimodal HMW-HDPE, recycled 55 gallon drums constructed from HMW-HDPE, plastic dry cleaning bag material made of LLDPE, and the like. Because it is a simple test to conduct, the FRR is, therefore, preferred to GPC for estimating the polydispersity of the resins, where the polydispersity is not specified, prior to their use in the melt blend compositions.

The FRR is the ratio of the high load melt index (HLMI, condition F at 21.6 kg at 190° C.) to the melt index (MI, condition E at 2.16 kg and 190° C.). For example, an LLDPE or a LMDPE with a nominal MI of 0.7 and a HLMI of 21.0 would have an FRR (HLMI/MI=21.0/0.7) of about 30. HMW-HDPE having an HLMI of 4.5 and an MI of 0.05 would have an FRR of about 90. Both of these materials would be considered to have a narrow molecular weight distribution and low polydispersity. Polyethylene resins suitable for use in the invention compositions can have a FRR of about 20 to about 200, preferably about 90 to about 130. The LLDPE and LMDPE resins suitable for use in the compositions according to the invention have a very narrow MWD and an FRR of about 20 to about 60.

The FRR is also a good indicator of the processability at higher shear rates of the final melt blended compound. Therefore, an advantage of the methods of the invention, is that the FRR of a final composition can be predetermined by selecting resins having FRR values that will achieve desired processing and final product considerations, such as processability, melt strength, die swell ratio, forming, wall thickness, and the like. It is preferred that the final melt-blended composition have an FRR of about 80 to about 130, with about 90 to about 110 being more preferred. It has been found that melt-blended compositions with FRR greater than 150 risk failing the 24 hour stress crack resistance test (NCTL) and may be difficult to process.

The LLDPE, LMDPE and HDPE resins used in the composition, methods, and articles according to the invention, can be unimodal, bimodal, multimodal, or mixtures of these types. By the "modality" of the resins, is meant the number of peaks in a molecular weight distribution curve.

In one embodiment of the invention, a polyethylene composition comprises a melt blend of HDPE and at least one resin selected from the group consisting of LLDPE, LMDPE, and mixtures thereof, the resins being present in the melt-blended polyethylene composition in amounts relative to one another such that the composition has a density of about 0.945 to about 0.960 g/cm$^3$, a melt flow index of about 0.1 to about 0.4, and a stress crack resistance of at least 24 hours. The resins are independently selected from the group consisting of virgin, recycled, scrap and wide specification resins, and mixtures thereof. The LLDPE and/or the LMDPE can be present in the composition in an amount of about 5 to about 50 percent by weight, preferably about 15 to about 45 percent by weight and, more preferably, about 20 to about 35 percent by weight. The LLDPE and/or the LMDPE resin can have a melt flow index of about 0.1 to about 1.5, preferably about 0.4 to about 1.0. The density of the linear resins can range from about 0.920 to about 0.940 g/cm$^3$, preferably about 0.925 to about 0.935 g/cm$^3$. As known to those skilled in the art, the density of LLDPE is about 0.910 to 0.925 g/cm$^3$, and the density of LMDPE is about 0.926 to about 0.940 g/cm$^3$. However, suitable LLDPE for use in the compositions according to the invention has a density of about 0.920 to about 0.925 g/cm$^3$.

The HDPE resin can be selected from the group consisting of HMW-HDPE resin having a melt flow index of about 0.01 to about 0.2, preferably about 0.05 to about 0.15, and H-HDPE having a melt flow index of about 0.1 to about 1.5, preferably about 0.3 to about 1.0, and mixtures thereof. The HMW-HDPE can have a density of about 0.941 to about 0.958 g/cm$^3$, preferably about 0.945 to about 0.955 g/cm$^3$ and the H-HDPE can have a density of about 0.957 to about 0.970 g/cm$^3$, preferably about 0.959 to about 0.965 g/cm$^3$. The HDPE component can be present in the composition in an amount of about 50 to about 95 percent by weight, preferably about 55 to about 85 percent by weight. The H-HDPE can be present in an amount of about 50 to about 95 percent by weight. More preferably, the H-HDPE is present in an amount of about 55 to about 85 percent by weight.

A suitable HMW-HDPE for use in the melt blends according to the invention has a weight average molecular weight of about 100,000 to about 1,000,000 daltons. As is known to those skilled in the art, the melt flow index of the polymer varies inversely with the molecular weight. According to the invention, the HMW-HDPE is preferably selected based on its melt flow index and density, rather than its particular molecular weight.

Any or all of the LLDPE and/or the LMDPE and the HDPE resins in the embodiments of the invention melt blended compositions can be recycled, wide specification, scrap and/or virgin resin, with mixtures of these source resins being typical. In particular, the use of recycled, wide specification and/or scrap resins is very economical in comparison to the use of virgin resins. Suitable virgin, scrap, recycled and wide specification LLDPE, H-HDPE, and HMW-HDPE are known in the art. Virgin resins are commercially available from, for example, Exxon Mobil Corporation (Irving, Tex.), Chevron Phillips Chemical Company LP (Houston, Tex.), Dow Chemical Company (Midland, Mich.), Ipiranga Química (Porto Alegre, Brazil), Samsung General Chemicals Co., Ltd. (Seosan, Korea), and SABIC Plastic Products (Riyadh, Saudi Arabia).

Exemplary recycled and/or scrap LLDPE and LMDPE can be, but are not limited to, for example, printed plastic dry cleaning bag material, off-color plastic bags and the like. The visual characteristics of the printed or off-color plastic bags are not apparent when used in compositions for applications, including pipe and pipe fittings, where the addition of carbon black or another colorant masks the off-color material and/or the printing dye. Exemplary recycled and/or scrap HMW-HDPE film used to make plastic bags, such as grocery bags or "T-shirt bags" for the retail clothing industry, and the like, may be recycled for use in the melt blends in accordance with the invention. For example, such plastic bags can be constructed of bimodal HMW-HDPE. Other examples of recyclable materials constructed of HMW-HDPE include, but are not limited to, 55 gallon plastic drums. H-HDPE used to make milk jugs or other such containers, for example, may be recycled for use in the melt blends in accordance with the invention.

Wide specification resins differ from on-specification resins in that a wide specification resin is out of the desired specification range for at least one physical property including, but not limited to, density, melt flow index and FRR. Because on-specification resins are desirable and sometimes necessary for particular applications, they can command a premium price. Therefore, by using wide specification resins in the melt blends of the embodiments of the invention composition, it is possible to achieve a cost savings in comparison to using resins having specified properties. As a non-limiting example, when wide specification LLDPE and/or LMDPE resin is employed, the physical properties of the melt blend compositions are obtained by compensating for the out-of-range specification characteristic with a formulation change that can include one or more HDPEs having a corresponding off-setting characteristic. For example, to compensate for LLDPE having a melt flow index in a range of 0.4 to 1.0, HDPE having a low melt flow index of, for example, 0.01 to 0.1 can be employed, or the proportion of HDPE with a melt flow index range of, for example, 0.05 to 0.1 can be increased in the composition. As another example, to compensate for LLDPE having a density of, for example, 0.920 g/cm$^3$, a 50:50 mixture of the LLDPE and an H-HDPE having a density of 0.965 g/cm$^3$ can be employed, to bring the density of the final product to 0.945 g/cm$^3$. However, because LLDPE has good stress crack resistance, it is desirable to use a only small amount of, for example, H-HDPE which has a low stress crack resistance. In general, as the density of the HDPE increases, the less is the amount of the HDPE required in the composition to achieve the desired density, melt flow index and other physical properties.

A feature of the invention compositions is that more than one LLDPE, LMDPE, H-HDPE, and/or HMW-HDPE, each having individual ranges of density, MFI and/or FRR and/or modalities, can be employed to increase the flexibility by which components can be melt-blended together in order to achieve the desired physical characteristics of the resulting composition. For example, it is possible to use combinations of resins that include, for example but not limited to, one to about 6 or more individual LLDPEs, LMDPEs, H-HDPEs, and/or HMW-HDPEs.

Once in possession of the teachings herein, including the examples below, of components which can be utilized to achieve the desired physical properties of the melt blend compositions, the selection of suitable components, not limited to those expressly disclosed, will be within the ordinary skill in the art. The invention practitioner will be able to adjust the components of the composition for specification variations without undue experimentation.

The melt-blended compositions of the invention can be used to produce an extruded, molded or formed plastic article having a density of about 0.945 to about 0.960 g/cm$^3$, a melt flow index of about 0.1 to about 0.4, and a stress crack resistance of at least 24 hours. Exemplary articles include, but are not limited to, pipe, including conduit pipe, pipe fittings, wire insulation material, cable insulation materials, films, sheets, and environmental chambers, especially for applications described above.

The melt-blended compositions of the invention are particularly useful to produce profile or corrugated pipe and/or pipe fittings, having physical properties that conform to applicable standards. As a non-limiting example of pipe and pipe fitting applications, the compositions can be used to produce profile and corrugated pipe having a density of 0.945 to 0.955, a MFI of about 0.1 to 0.4, a minimum flexural modulus of 110,000 psi, a minimum tensile strength of 3,000 psi and a minimum stress crack resistance of at least 24 hours, as required by current AASHTO standards.

Generally, a small diameter extruded pipe (e.g., about 2 inches to about 12 inches) is easier to extrude and form. Thus, a small diameter pipe, for example, can be formed from a melt blend composition of the invention having a MFI of about 0.3 to less than 0.4; whereas a large diameter extruded pipe (e.g., about 36 inches to about 72 inches) should be stiffer for extrusion and forming. Therefore a large diameter pipe can be formed from a melt blend composition having a MFI of about 0.15 to about 0.2, for example. Medium diameter pipes (e.g., about 15 inches to about 30 inches) can be formed from a melt blend composition having a moderate MFI of about 0.2 to about 0.3, for example.

Similarly, it is generally understood that the processability of corrugated pipe is improved by an increased stiffness of the melt blend, in comparison to the stiffness of the melt blend used to produce profile pipe. Accordingly, one of ordinary skill in the art could produce pipe according to the invention by varying the proportions of the melt blend components in the melt blend until the desired melt flow index and density of the composition was achieved, without undue experimentation.

Natural ethylene polymers have a detrimental property in that they slowly degrade in the presence of oxygen (air), and the degradation is known to be accelerated by the presence of heat and/or ultraviolet radiation. Preferably, pipes or pipe fittings comprising the melt blended composition are compounded with small amounts of carbon black, or other photo- and thermal-oxidation retarders to minimize the effects of heat and ultra violet light. For example, the composition can comprise carbon black (about 1 percent to about 5 percent, preferably about 2 percent to about 3 percent by weight). The carbon blacks can include any of the commonly available, commercially-produced carbon blacks including, but not limited to, furnace blacks, acetylene blacks, channel blacks and lamp blacks.

The compositions according to the invention may also comprise other additives customary for use in resin-based compositions, according to the application for which they are being used. Such additives include, but are not limited to, antioxidants, antiozonants, lubricants, stabilizers, processing aids, water-proofing fillers, inorganic fillers, colorants, curatives, and the like. These additives are used in amounts designed to provide their intended effect in the resulting composition. The total amount of such additives can range from zero to about 10 percent by weight based on the total weight of the composition.

In one embodiment, a method for producing a polyethylene composition according to the invention comprises melt blending together a sufficient amount of a HDPE resin and a sufficient amount of at least one additional resin selected from the group consisting of LLDPE resins, LMDPE resins, and mixtures thereof, to produce a melt-blended composition having a density of about 0.945 to about 0.960 g/cm$^3$, a melt flow index of about 0.1 to about 0.4, and a stress crack resistance of at least 24 hours. The HDPE resin can be present in an amount of about 50 to about 95 percent by weight.

In another embodiment, a method for producing a polyethylene composition according to the invention comprises melt blending together a sufficient amount of a HDPE resin selected from the group consisting of a HMW-HDPE resin having a density of about 0.941 to about 0.958 g/cm$^3$ and a melt flow index of about 0.01 to about 0.2, a H-HDPE resin having a density of about 0.957 to about 0.970 g/cm$^3$ and a melt flow index of about 0.1 to about 1.5, and mixtures thereof; and a sufficient amount of at least one additional polyethylene resin having a melt flow index of about 0.1 to about 1.5 and a density of about 0.920 to about 0.940 g/cm$^3$, to produce a melt-blended composition having a density of about 0.945 to about 0.960 g/cm$^3$, a melt flow index of about 0.1 to about 0.4, and a stress crack resistance of at least 24 hours. The HDPE resin can be present in an amount of about 50 to about 95 percent by weight.

The LLDPE, LMDPE and HDPE resins can be in pellet, powdered, flake or regrind form, or the like. The methods are not intended to be limited to any one method of melt blending the components. For example, mixing or melt blending of components, including any additives if used, can be by batch compounding, such as in a Banbury or Henschel type mixer, or can be continuous compounding in an extruder. For example, in one embodiment of the method, the components of the composition can be dry-blended prior to melt blending by single screw or twin screw extrusion. In another embodiment, the dry components can be separately fed through separate ports into an extruder for melt blending. In yet another embodiment, the two or more components can be pre-combined in a mixer, such as a Banbury or Henschel mixer, preferably under high intensity blending, to form a hot melt which then can be combined with a third component (e.g., a let down resin) in an extruder. For example, a sufficient amount of LLDPE and H-HDPE can be preblended in a Banbury mixer, and the resulting composition blended with a sufficient amount of HMW-HDPE in an extruder to produce the desired percentages of each of the three types of components in the final composition. Moreover, any of the components can be mixed with, for example, carbon black or other colorants and/or other additives, as a master batch, which is then added to a let down resin comprising one or more of the remaining components to produce the desired percentages of the components in the final composition. As a non-limiting example, 25% of a master batch composition comprising 90% LLDPE and 10% carbon black can be combined with 75% HDPE let down resin to provide the desired amount of LLDPE, HDPE and carbon black in the final composition to provide the desired properties of density and melt flow index. The temperatures and other variables required for dry blending, hot melts, and melt blending are well known to those skilled in the art.

Following melt blending of the components, the composition can be injection molded, blow molded, rolled, milled, sheet extruded, film extruded, pipe extruded, or formed or fabricated in any manner whatsoever to form the desired product by known methods. Once the teachings herein are in hand, the skilled practitioner of this invention will be able to adapt conventional methods of forming material, such as injection molding and other techniques mentioned above, to the production of desired articles of manufacture using the polyethylene composition of the invention. This adaptation can be implemented on an empirical basis, without undue experimentation.

EXAMPLES

The following examples illustrate methods of preparation of melt blended polyethylene compositions of the invention. However, the examples are not intended to be limiting, as other methods for preparing these compounds and different compounding formulations may be determined by those skilled in the art. Further, the blend components are not limited to the specific polyethylenes shown. Thus, it is believed that any of the variables disclosed herein can readily be determined and controlled without departing from the scope of the invention herein disclosed and described.

Below are three examples of preferred embodiments in which the mix ratios of LLDPE, H-HDPE and HMW-HDPE components differ with respect to each other. In each of the following examples, the exemplary polyethylene was prepared under industry standard conditions using melt blending techniques as known in the art. Dry mixtures of pelletized LLDPE and HDPEs were introduced directly into a profile extruder to produce HDPE pipe.

The H-HDPE used in all of the following examples was Grade GD 4960, supplied by Ipiranga Química (Porto Alegre, Brazil), having a melt flow index of 0.80 and a density of 0.962 g/cm$^3$. The HMW-HDPE used in all of the examples was grade F120A, supplied by Samsung General Chemicals Co., Ltd. (Seosan, Korea), having a melt flow index of 0.044 and a density of 0.956 g/cm$^3$. The LLDPE used in all of the examples was Grade 726N, supplied by SABIC Plastic Products (a division of Saudi Arabia Basic Industries Corporation, Riyadh, Saudi Arabia), having a melt flow index of 0.70 and a density of 0.926 g/cm$^3$.

Example 1

The percentages by weight of the polyethylene components used to produce a melt-blended polyethylene composition suitable for a producing a pipe having a diameter of about 24 to about 30 inches are listed below. The physical properties of the resulting melt-blended polyethylene composition are illustrated in Table 1.

35% H-HDPE
20% HMW-HDPE
45% LLDPE

Example 2

The percentages by weight of the polyethylene components used to produce a melt-blended polyethylene composition suitable for a producing a pipe having a diameter of about 12 to about 18 inches are listed below. The physical properties of the resulting melt-blended polyethylene composition are illustrated in Table 1.
- 40% H-HDPE
- 40% HMW-HDPE
- 20% LLDPE

Example 3

The percentages by weight of the polyethylene components used to produce a melt-blended polyethylene composition suitable for a producing a pipe having a diameter of about 36 to about 72 inches are listed below. The physical properties of the resulting melt-blended polyethylene composition are illustrated in Table 1.
- 35% H-HDPE
- 55% HMW-HDPE
- 10% LLDPE

TABLE 1

Physical properties of the melt-blended polyethylene compositions

| Property | Units | Test Method (ASTM) | Example 1 | Example 2 | Example 3 |
| --- | --- | --- | --- | --- | --- |
| Density | g/cm$^3$ | D1505 | 0.945 | 0.952 | 0.955 |
| MFR (190° C.) | g/10 min | D1238 | 0.4 | 0.25 | 0.15 |
| NCTL | hours | D5397 | >24 | >24 | >24 |
| Tensile Strength | psi | D 638 | 3000 | 3200 | 3500 |
| Flexural Modulus | psi | D 790 | 110,000 | 135,000 | 160,000 |
| Notched Izod | ft-lb/in | D 256 | 5 | 4 | 3 |
| Cell Classification | n/a | D3350 | 335400 | 335400 | 335400 |
| Flow Rate Ratio | n/a | D1238 | 80 | 90 | 110 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. A melt-blended polyethylene composition comprising:
a first high density polyethylene resin having a melt flow index of about 0.01 to about 0.2 and a density of about 0.941 to about 0.958 g/cm$^3$;
a second high density polyethylene resin having a melt flow index of about 0.1 to about 1.5 and a density of about 0.957 to about 0.970 g/cm$^3$; and
a third polyethylene resin selected from the group consisting of linear low density polyethylene resins, linear medium density polyethylene resins, and mixtures thereof,
said resins being present in the melt-blended polyethylene composition in amounts relative to one another such that the composition has a density of about 0.945 to about 0.960 g/cm$^3$, a melt flow index of about 0.1 to about 0.4, and a stress crack resistance of at least 24 hours.

2. The composition of claim 1, wherein the first, second and third resins are each independently selected from the group consisting of virgin, recycled, scrap and wide specification resins, and mixtures thereof.

3. The composition of claim 1, wherein the third polyethylene resin has a melt flow index of about 0.1 to about 1.5.

4. The composition of claim 1, wherein the third polyethylene resin has a density of about 0.920 to about 0.940.

5. The composition of claim 1, wherein the first and second high density polyethylene resins are each independently selected from the group consisting of a unimodal resin, a bimodal resin, a multimodal resin, and mixtures thereof.

6. The composition of claim 1, wherein the first and second high density polyethylene resins are present in a total amount of about 50 to about 95 percent by weight.

7. The composition of claim 1, wherein the flow rate ratio of the melt-blended composition is about 80 to about 130.

8. The composition of claim 1, wherein the flow rate ratio of the linear low density polyethylene and the linear medium density polyethylene is about 20 to about 60.

9. The composition of claim 1, wherein the density of the melt-blended composition is 0.945 to 0.955 and the melt flow index is about 0.1 to 0.4.

10. The composition of claim 1, wherein the first and second high density polyethylene resins are each independently selected from the group consisting of a high molecular weight high density polyethylene resin, a homopolymer high density polyethylene resin, and mixtures thereof.

11. The composition of claim 1, wherein the flow rate ratio of the first and second resins is about 20 to about 200.

12. The composition of claim 11, wherein the flow rate ratio of the first and second resins is about 90 to about 130.

13. The composition of claim 1, wherein the melt flow index of the melt-blended composition is about 0.15 to about 0.35.

14. The composition of claim 13, wherein the melt flow index of the melt-blended composition is about 0.2 to about 0.3.

15. A melt-blended polyethylene composition comprising:
a high molecular weight high density polyethylene resin having a density of about 0.941 to about 0.958 g/cm$^3$ and a melt flow index of about 0.01 to about 0.2;
a homopolymer high density polyethylene resin having a density of about 0.957 to about 0.970 g/cm$^3$ and a melt flow index of about 0.1 to about 1.5; and at least one additional polyethylene resin selected from the group consisting of linear low density polyethylene resins, linear medium density polyethylene resins, and mixtures thereof, said resins being present in the melt-blended polyethylene composition in amounts relative to one another such that the composition has a density of about 0.945 to about 0.960 g/cm$^3$, a melt flow index of about 0.1 to about 0.4, and a stress crack resistance of at least 24 hours.

16. The composition of claim 15, wherein the high molecular weight high density polyethylene resins and homopolymer high density polyethylene resins is are present in a total amount of about 50 to about 95 percent by weight.

17. The composition of claim 15, wherein each of the resins are independently selected from the group consisting of virgin, recycled, scrap and wide specification resins, and mixtures thereof.

18. A plastic article comprising a melt blended polyethylene composition that comprises:
   a first high density polyethylene resin having a melt flow index of about 0.01 to about 0.2 and a density of about 0.941 to about 0.958 g/cm$^3$;
   a second high density polyethylene resin having a melt flow index of about 0.1 to about 1.5 and a density of about 0.957 to about 0.970 g/cm$^3$; and
   a third polyethylene resin selected from the group consisting of linear low density polyethylene resins, linear medium density polyethylene resins, and mixtures thereof,
   said resins being present in the melt-blended polyethylene composition in amounts relative to one another such that the composition has a density of about 0.945 to about 0.960 g/cm$^3$, a melt flow index of about 0.1 to about 0.4, and a stress crack resistance of at least 24 hours.

19. The article of claim 18, wherein the first, second and third resins are each independently selected from the group consisting of virgin, scrap, recycled, and wide specification resins, and mixtures thereof.

20. The composition of claim 18, wherein the first and second high density polyethylene resins are present in an total amount of about 50 to about 95 percent by weight.

21. The composition of claim 18, wherein the first and second high density polyethylene resins are each independently selected from the group consisting of a high molecular weight high density polyethylene resin, a homopolymer high density polyethylene resin, and mixtures thereof.

22. A plastic article comprising a melt blended polyethylene composition that comprises:
   a high molecular weight high density polyethylene resin having a density of about 0.941 to about 0.958 g/cm$^3$ and a melt flow index of about 0.01 to about 0.2;
   a homopolymer high density polyethylene resin having a density of about 0.957 to about 0.970 g/cm$^3$ and a melt flow index of about 0.1 to about 1.5; and
   at least one additional polyethylene resin selected from the group consisting of linear low density polyethylene resins, linear medium density polyethylene resins, and mixtures thereof,
   said polyethylene resins being present in the melt-blended polyethylene composition in amounts relative to one another such that the composition has a density of about 0.945 to about 0.960 g/cm$^3$, a melt flow index of about 0.1 to about 0.4, and a stress crack resistance of at least 24 hours.

23. The article of claim 22, wherein the first, second and third resins are each independently selected from the group consisting of virgin, scrap, recycled, and wide specification resins, and mixtures thereof.

24. The article of claim 22, wherein the high molecular weight high density polyethylene resin and homopolymer high density polyethylene resin are present in a total amount of about 50 to about 95 percent by weight.

25. A method for producing a polyethylene composition, comprising melt blending together a sufficient amount of a first high density polyethylene resin having a melt flow index of about 0.01 to about 0.2 and a density of about 0.941 to about 0.958 g/cm$^3$, a second high density polyethylene resin having a melt flow index of about 0.1 to about 1.5 and a density of about 0.957 to about 0.970 g/cm$^3$, and a sufficient amount of a third polyethylene resin selected from the group consisting of linear low density polyethylene resins, linear medium density polyethylene resins, and mixtures thereof to produce a melt-blended composition having a density of about 0.945 to about 0.960 g/cm$^3$, a melt flow index of about 0.1 to about 0.4, and a stress crack resistance of at least 24 hours.

26. The method of claim 25, wherein the first, second and third resins are each independently selected from the group consisting of virgin, recycled, scrap and wide specification resins, and mixtures thereof.

27. The method of claim 25, wherein the first and second high density polyethylene resins are present in a total amount of about 50 to about 95 percent by weight.

28. The composition of claim 25, wherein the first and second high density polyethylene resins are each independently selected from the group consisting of a high molecular weight high density polyethylene resin, a homopolymer high density polyethylene resin, and mixtures thereof.

29. A method for producing a polyethylene composition, comprising melt blending together a sufficient amount of a high molecular weight high density polyethylene resin having a density of about 0.941 to about 0.958 g/cm$^3$ and a melt flow index of about 0.01 to about 0.2; a homopolymer high density polyethylene resin having a density of about 0.957 to about 0.970 g/cm$^3$ and a melt flow index of about 0.1 to about 1.5; and a sufficient amount of at least one additional polyethylene resin selected from the group consisting of linear low density polyethylene resins, linear medium density polyethylene resins, and mixtures thereof, to produce a melt-blended composition having a density of about 0.945 to about 0.960 g/cm$^3$, a melt flow index of about 0.1 to about 0.4, and a stress crack resistance of at least 24 hours.

30. The method of claim 29, wherein each of the resins is independently selected from the group consisting of virgin, recycled, scrap and wide specification resins, and mixtures thereof.

31. The method of claim 29, wherein the high molecular weight high density polyethylene resin and homopolymer high density polyethylene resin are present in a total amount of about 50 to about 95 percent by weight.

* * * * *